(12) United States Patent
Hill (10) Patent No.: US 7,942,429 B2
(45) Date of Patent: May 17, 2011

(54) AMPHIBIOUS, SUBMERSIBLE, STREAMLINED TRANSPORT DEVICE FOR SCUBA GEAR

(76) Inventor: Stacie Hill, Redwood City, CA (US)

(*) Notice: Subject to any disclaimer, the term of this patent is extended or adjusted under 35 U.S.C. 154(b) by 243 days.

(21) Appl. No.: 12/288,287

(22) Filed: Oct. 18, 2008

(65) Prior Publication Data

US 2010/0096821 A1 Apr. 22, 2010

(51) Int. Cl.
*B62B 1/00* (2006.01)
*B62B 1/18* (2006.01)
*B62B 1/20* (2006.01)
*B62B 1/22* (2006.01)
*B62B 1/26* (2006.01)
*B62B 1/24* (2006.01)

(52) U.S. Cl. ............ 280/47.26; 280/47.17; 280/47.19; 280/47.24; 280/79.11; 280/79.5; 280/79.6; 280/79.7

(58) Field of Classification Search ............ 280/47.26, 280/47.131, 47.17, 47.34, 79.11, 79.6, 79.7
See application file for complete search history.

(56) References Cited

U.S. PATENT DOCUMENTS

| | | | |
|---|---|---|---|
| 4,438,764 A * | 3/1984 | Eppolito | 128/205.22 |
| 4,754,996 A | 7/1988 | Tecca | |
| 4,790,559 A | 12/1988 | Edmonds | |
| 4,815,761 A | 3/1989 | Henderson | |
| 4,832,398 A | 5/1989 | Tecca | |
| 5,131,670 A | 7/1992 | Clements et al. | |
| 5,393,080 A | 2/1995 | Ross | |
| 5,423,586 A | 6/1995 | Fuller | |
| 5,492,346 A | 2/1996 | Stadler et al. | |
| 5,511,846 A | 4/1996 | Fuller | |
| 5,653,458 A * | 8/1997 | Chaparian | 280/30 |
| 5,704,624 A | 1/1998 | Davis | |
| 6,341,789 B1 | 1/2002 | Checa et al. | |
| 6,565,103 B2 | 5/2003 | Scot | |
| 6,926,293 B1 | 8/2005 | Pope | |
| 7,347,429 B2 | 3/2008 | Murillo | |
| 2004/0104550 A1 | 6/2004 | Do | |
| 2004/0255938 A1* | 12/2004 | Shragge | 128/201.27 |
| 2005/0236789 A1* | 10/2005 | Knox et al. | 280/79.5 |

(Continued)

FOREIGN PATENT DOCUMENTS

| | | |
|---|---|---|
| GB | 2 394 035 A | 4/2004 |
| GB | 2 440 551 A | 6/2008 |
| WO | WO 98/43861 | 10/1998 |

OTHER PUBLICATIONS http://www.amazon.com/Tilos-Guardsman-Duffel-Roller-Transport/dp/B000LSZI8K.

(Continued)

*Primary Examiner* — J. Allen Shriver, II
*Assistant Examiner* — Bryan A Evans (57) ABSTRACT

A device used in beach-entry scuba dives that both assists the diver to transport scuba tanks and other diving gear to and across the shoreline, and then accompanies the diver and gear underwater. The device holds at least one scuba tank and associated gear such as a buoyancy compensator (BCD), and has a pair of wheels whose rolling position enables the loaded device to be easily transported over natural terrains. Upon reaching or while in the water the wheels may be shifted from the "rolling position" into a streamlined, free-swim position. The means attaching the scuba gear and the scuba tank are easily operated to let the user now don both scuba tank and gear and start their dive, taking the device along for the return cross-shore trip.

17 Claims, 7 Drawing Sheets

U.S. PATENT DOCUMENTS

2006/0071435 A1* 4/2006 Zwack .................. 280/47.27
2008/0106051 A1   5/2008 Presilla
2008/0150245 A1   6/2008 Clatt

OTHER PUBLICATIONS http://beachstuf.com/BeachCart.html.

http://www.tortugascuba.com/travelbuddy.html.
http://www.tortugascuba.com/buddyll.html.
http://www.tortugascuba.com/travelsolo.htm.
http//www.overstock.com/Sports-Toys/Scuba-Tank-n-Tow/1135978/product.html.

* cited by examiner

AMPHIBIOUS, SUBMERSIBLE, STREAMLINED TRANSPORT DEVICE FOR SCUBA GEAR

BACKGROUND OF THE INVENTION

1. Field of the Invention

This invention relates to amphibious and submersible scuba gear transport devices. More particularly, it concerns devices used in making beach-entry scuba dives by assisting the diver to transport scuba tanks and other diving gear from paved or otherwise man-improved surfaces, across intervening sand, gravel, rocks, or other like natural terrains; namely, between their starting point (i.e. car, dive shop, etc) and their entry point into the water—and also, the return (but not necessarily reverse) trip.

2. Description of the Prior Art

For years it has been well known that sailors go down to the sea in ships, and divers go down in the sea with airtanks. One unconsidered and unaddressed problem has been: how do those airtanks and divers get to the sea?

Perhaps—no, probably—the question was long unconsidered because the original pioneers who used Self-Contained Underwater Breathing Apparatus ('SCUBA' tanks) were young, extra-ordinarily muscular and healthy men, almost entirely members of Underwater Demolition Teams or other military elites such as the SEALS, SOGs, and their equivalents in this and other nations. These young, fit men muscled their gear from the offloading point to the waves in a straight-forward, earnest, and (let's be honest) unimaginative fashion.

Over the decades, however, scuba-diving became a far more broad-spread participatory sport. Divers no longer need to be extraordinarily fit—or male, with the upper-body lifting and torso strength bias of that sex. Divers could start from well-equipped dive boats, from municipal piers extending into the water; or with another diver such as a paid instructor or divemaster helping them through the process (including in that help, taking on the chore and effort of getting the gear to the shoreline). In fact many people that are considered disabled are now turning to diving; because the weightlessness they experience while in the water enables them to participate in a sport just like anyone else. Once, that is, someone else solves the problem of their not being able to carry their equipment to the water. For many who are not SEALs or more-than-normally fit and strong, shore diving is still just a dream. Because the SCUBA tanks and other gear (regulator, Buoyancy Control Device or 'BCD', dive weights, fins, waterproof cameras, lights, snorkel, etc. etc.) seem to have a very high irreducible minimum, starting at 50 and going upwards to 100 pounds.

While many marine dives using scuba gear (which includes airtanks and other gear) are made from boats, it is also common to make such dives from beaches or other land areas; these are generally called 'beach entry dives'. Normally beach entry dives involve transporting the scuba gear in an automobile or like transport as close to the water's edge as possible, precisely because the scuba gear is both weighty and awkward to carry. This difficulty may be accentuated by the diver's needing to wear a bulky neoprene suit ('wet' or 'dry', depending) in the water; since such suits if worn on land, particularly while engaging in muscular activity, can create the risk of heatstroke due to their considerable (and necessary) insulation. Far too often no automobile can be driven closer than several hundred meters to the water—sometimes due to legal restrictions, sometimes due to terrain limitations—requiring a diver to carry the scuba tanks and other gear first to and then over the beach to the water's edge. This also commonly requires multiple trips back and forth. While it is nice for would-be divers that formerly pristine and untenanted, or at least unvisited, beaches are now much more often accessible; a sad reality is that the same accessibility increases the risk that any gear left on the beach while the diver is underwater, or making one of many trips back and forth from the car, may be taken by other, less aquatically-inclined but more acquisitively-inclined beachgoers. Also, it is common to encounter currents, or experience navigation errors, while underwater that displace the diver so her exit point is not where her entry point was, separating her from any gear left on shore at the entry point.

The fact remains that scuba-gear still is weighty and difficult to carry; and diving from 'just any beach' still requires someone to muscle the mass over the terrain without any assistance. Traversing rocks, gravel, and dry or wet sand—or combinations of the above encountered when trying to reach an unimproved, i.e. natural beach—while carrying that weight, is both a considerable effort and a task that can (through a single mis-step) go awry and prematurely end a planned dive, due to a badly-twisted ankle, scraped skin from an unbalanced fall, pulled muscles (especially in the back), or having a muscle accidentally bruised or crushed between the gear and the ground. This limitation is one of the reasons why many divers even now find daunting the idea of managing an unpaved, and even untracked, land-to-shoreline dive when they have to travel over natural terrain, even if that distance is only between 3 blocks and a ½ mile. Besides, it's just so much easier if a boat carries the dratted weight of the scuba gear!

This invention addresses that problem. As necessity—or at least strong interest—is the mother of invention, it is perhaps understandable that the inventor, being female, decided to use her brain instead of her brawn to tackle the problem of transferring scuba gear over the verge between land and sea. Being a scuba instructor and experienced in the fact that divers often come to shore a considerable distance from where they start out, she also recognized that the transportation device needed to be as portable, via the intervening sea passage, as the scuba gear itself, since it had to accompany both diver and gear. Because, being also both thrifty, and aware of the potential limitations on the honesty of those remaining on-shore while the diver frolics in the oceanic or at least aquatorial experience, she recognized that the solution should not depend on leaving either the scuba gear, or carrying means, resting untended at one point on the shoreline while traversing to the location of the other, lest it 'disappear' with the connivance and through the effort of a loose-moraled interloper.

The present embodiment of the invention disclosed in this application addresses those problems and solves them. It considers and solves, as well, some of the associated and secondary issues that would arise from a too-straight application of what might seem to be obvious alternatives. The absence of any like solution to what has been a problem since the first prototype SCUBA tank and regulator was used, nearly three-score and ten years ago, strongly evidences that this invention, meeting that long-felt need, is hardly as 'obvious' as it may appear in a hindsight-driven evaluation of potential combinations. There are a number of inventions in this field and a number of non-patent commercial devices, all of which comprise the prior art in what is a surprisingly-busy field. But the simple question is: as all of those combinations were feasible for all of that intervening time, why didn't anybody else who was a diver, put two and two and two together, and come up with the same 'six' found in the present invention?

For example, Checa, F. et al. (U.S. Pat. No. 6,341,789) teach a variation on the ancient ox-cart design of Babylonian times, adapted to transport of scuba gear via the hand-cart, dolly, and two-wheeled handcarts of intervening periods. Given the use of considerable amount of metal and complete lack of any interest in streamlining, it is obvious that this invention was never considered for amphibious use, but was to be left on the shore.

Davis, G. (U.S. Pat. No. 5,704,624) teach a more complex "scuba gear cart" than Checa's, chiefly through having multiple "conveying surfaces"—each such surface specifically designed to handle "a particular surface material over which the cart is moved". Despite its complex structure and fittings (eye hooks, sidewalls, keel, hull, surface troughs, etc.), this cart is left behind on the shore, as the patent states through ellipsis—the dive operation takes place entirely between one paragraph and the next. The concept of amphibious use to carry (via the hull, acting as its own boat) is present, yet in such fashion that the inventor entirely denies the concept, or at least desirability, of submergibility.

Fuller, M. (U.S. Pat. No. 5,511,846) teaches a muscle-based—pardon, a strap-based carrier for a scuba tank only, that, while being itself amphibious and submersible, entirely leaves the cross-terrain transportation of the scuba tank in the carrier to the user's muscles and balance. Given the relative massiveness and heft of a scuba tank alone (begging entirely the non-addressed issue of the other necessary scuba gear), the patented 'convenience' is rather blithely asserted— though an indirect acknowledgement of some further problem(s) is made as the patent speaks of that invention's assisting "in resisting abrasion when the tank is dragged on an abrasive surface". This patent is a continuation-in-part of the same inventor's earlier-issued patent (U.S. Pat. No. 5,423, 586) that reveals no material differences relative to the present invention.

Stadler, L. et al. (U.S. Pat. No. 5,492,346) teach a wheel-based, solid-cover tote container—actually, a "pull-cart specially adapted for transporting scuba tanks". The intention that this be non-amphibious and not accompany the diver can be readily ascertained, as the specification highlights as a feature the fact that "prior art devices do not include a locking mechanism to prevent undesired access to equipment which may be left on a beach during a dive".

Ross, S. (U.S. Pat. No. 5,393,080) teaches a tank dolly that has both amphibious and submersible features, but incorporates as major elements both rigid side rails with a plurality of handles, and flanges providing an enabling, travois-style means for dragging the scuba tank over obstructions or steps, as it states: "The tank dolly thus comprises the cup 14, guards 20, wheels 22, and rails 16".

Clements, D. et al. (U.S. Pat. No. 5,131,670) teach an overground and thus non-amphibious (and of course non-submersible, aside from quicksand or bog) wheeled cart with elongate or relatively-movable axles. Their invention definitely "can be readily removed at such time as the tank is ready to be utilized for a dive".

Tecca, F. (U.S. Pat. No. 4,832,398; a continuation in part of U.S. Pat. No. 4,754,996) teaches a strap-based scuba tan carrier and holder, that depends on the user's muscles for cross-terrain transport and is neither amphibious nor submersible. The user leaves this device behind during the dive, as can be inferred from the statement in the specification, "When the driver has completed his diving and is ready to return his equipment to the vehicle, he removes the tank from his harness and places it in the carrier holder and straps it in place."

Henderson, R. et al. (U.S. Pat. No. 4,815,761) teaches a roller unit to help transport the scuba gear and then serve as the surface floating platform for the diver(s); yet this incorporates an element ("a buoyant roller") whose specific function is to keep the unit floating on top of the water to serve as the "offshore work and flag platform" (for the dive flag, to signal the diver's presence to boaters), one of the principle objects of that invention. This invention definitively teaches against making the transport device submersible. Any device one leaves at the surface needs to remain attached to the diver which limits the diver to short depths and absolutely no "penetration" into a wreck or cave. This type of diving is rarely done, and this type of equipment would most likely only be useful to a Scuba Instructor while they are teaching their students—which is done in shallow depths and with a floating device and flag.

Rolling luggage is a common sight in most airports, and many hotels and motels. The size of such luggage ranges considerably, including even a duffel bag advertised as suitable for transporting scuba gear; cf. the "Tilos Guardsman Duffel Roller Bag Transport Scuba Surf or Sports Gear", findable at http://www.amazon.com/Tilos-Guardsman-Duffel-Roller-Transport/dp/B000LSZ18K. As the attached photo discloses, however, the amphibian, submersible, and streamlining qualities of this product are dubious at best. This device is for transporting dive gear to a boat or for non-aquatic (ground/air) luggage. These have small, imbedded, "roller blade" type wheels that would not roll at all in wet or dry sand, from which one can tell that this product was never made to be used on the beach.

The hand-cart in a 'beach-suitable' form is also known; cf. the "Beach/Pool/Scuba Cart" findable at http://beachstuf.com/BeachCart.html. Again, as the attached photo disclosed, the amphibian, submersible, and streamlining qualities of this product are patently absent.

A primitive 'wheeled platform with straps' is known, cf. the 'Travel Buddy' findable at any of http://www.tortugascuba.com/travelbuddy.html, http://www.tortugascuba.com/buddyII.html, or http://www.tortugascuba.com/travelsolo.html. A complete absence of streamlining, even if the quality of submergibility is conceded, makes this unsuitably awkward at best, and generally unmanageable (particularly given any wave action or current) for in-dive usage by a scuba diver. All descriptions indicate that this device was made to be left on shore. Crossing the wave-zone wearing this broad flange could even be hazardous with even moderate wave action (4' crests).

A variation of the hand-cart designed solely for the scuba airtank is known; cf. the "Scuba Tank n Tow" findable at http://www.overstock.com/Sports-Toys/Scuba-Tank-n-Tow/1135978/product.html; which is also described in Knox, D. et al. (US 2005/0236789A1, filed Apr. 27, 2004; published Oct. 27, 2005). While both submersible and arguably amphibious, it is aimed at transporting "cylindrical tanks"; it will not assist with the transport of any other gear—and an airtank, alone, while necessary, is not sufficient, as divers are not naturally fitted with either buoyancy control devices or reducing valves!

OBJECTS

The principal object of the invention is providing an amphibious, submersible, and streamlined device that assists a diver in making beach entry dives.

A first partial object of the present invention is providing a device for transporting a complete set of scuba dive gear including one or more scuba tanks between a vehicular off-loading point and the water entry point, capable of readily traversing over a wide variety of terrain types. These terrain types include improved (e.g., cement or asphalt), unimproved (hard track or soft dirt) and natural surfaces (sand, gravel, or rock beaches). The device is also capable of being pulled down or up a set of stairs or other incline while fully loaded with a complete set of scuba dive gear.

A second partial object of the present invention is providing an amphibious, submersible, and streamlined device that, in addition to assisting a scuba diver in the to- and cross-beach transport of scuba gear, further, since it is wearable, goes underwater and presents minimal drag (so its streamlined design aids a safety aspect strongly desirable for all equipment worn while diving), can accompany the diver during his or her dive. Because the invention accompanies the scuba diver during his or her dive, this both eliminates any possible theft of the device (as it is not left unattended on shore during the dive), and enhances the diver's ability to start her dive in one place and then end it in another place without having to find and retrieve the on-shore transport—which is particularly useful if any water current or navigation error causes the exit and entry points to be different.

A third partial object of the present invention is allowing for the transformation from a surface-transport, amphibious, rolling device to a submersible device (and back again) to be made while the device and gear are in the water, thereby allowing the relative weightlessness that properly-balanced-balanced scuba gear can obtain in a water environment to exist, so that the user may never have to lift any weighted object to start, perform, and end their dive.

SUMMARY OF THE INVENTION

The device comprises a base to which is attached a flexible, form-fitting sleeve into which a scuba airtank is inserted. Also attached to the base is a pair of removable and re-attachable wheels, and also attached to the flexible, form-fitting sleeve is a fastenable pocket into which the wheels may be placed when removed, and further attached to the flexible, form-fitting sleeve is at least one strap that can bind the scuba airtank into the flexible, form-fitting sleeve and can also bind other items of scuba gear, such as a buoyancy control device, to the flexible, form-fitting sleeve. This combination thus allows a diver to use the device in a land-transport mode with the wheels attached to cross either improved or natural terrain and, upon reaching the water, then remove the wheels, place them into the fastenable pocket, access and don all of her scuba gear including the buoyancy control device without removing the latter from its attachment to the device and thus, wearing the device, engage in her dive with the device forming a streamlined, non-catching, low-profile and safer whole with the scuba airtank. Because the device will be accompanying the diver throughout her dive, it will be immediately available at the point where she wishes to exit the water, requiring only the re-attachment of the wheels and of the scuba gear previously worn to the strap(s), to again be available in its land-transport mode.

BRIEF DESCRIPTION OF THE DRAWINGS

A more complete understanding of the invention may be had by reference to the accompanying drawings in which:

FIG. 2 is a side view of the present embodiment of the invention. The base [1] has attached to it a flexible, form-fitting sleeve [3], into which a scuba airtank [11] can be inserted. One of a pair of removable and re-attachable wheels [5] is shown as attached to the base [1], from this point of view hiding the other of the pair. The fastenable pocket [7] is shown attached to the flexible, form-fitting sleeve [3]. The strap that can bind the scuba airtank into the flexible, form-fitting sleeve is also shown [9]. Also shown, though not separately claimed, are a second strap and a 'D'-ring attached to the flexible, form-fitting sleeve.

DETAILED DESCRIPTION OF THE INVENTION

Figure 1:
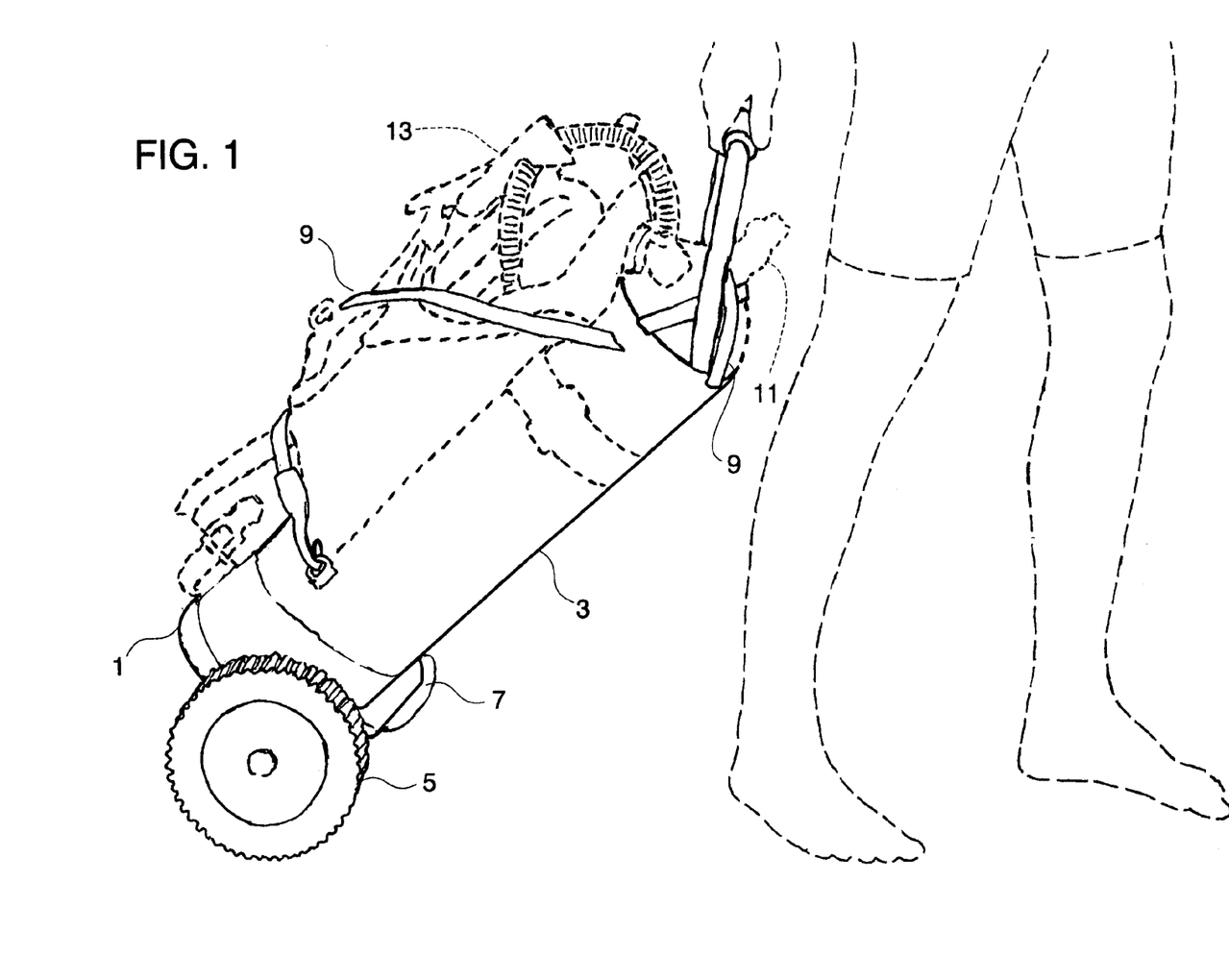
FIG. 1 is view of the present embodiment of the invention as it is being towed by a diver, using a handle attached to the flexible, form-fitting sleeve [3] that in turn contains a scuba airtank [11] and is attached at the end nearest the ground to a base [1], which has a pair of removable and re-attachable wheels [5] attached. Also visible are the fastenable pocket [7] on the external side of the flexible, form-fitting sleeve [3], and a strap [9] which is binding both the scuba airtank [11] and other items of scuba gear [13] to the combination, enabling the whole to roll over the various improved or natural terrains that may be encountered between the vehicular drop-off point and the point where the diver will enter the water.
Figure 2:
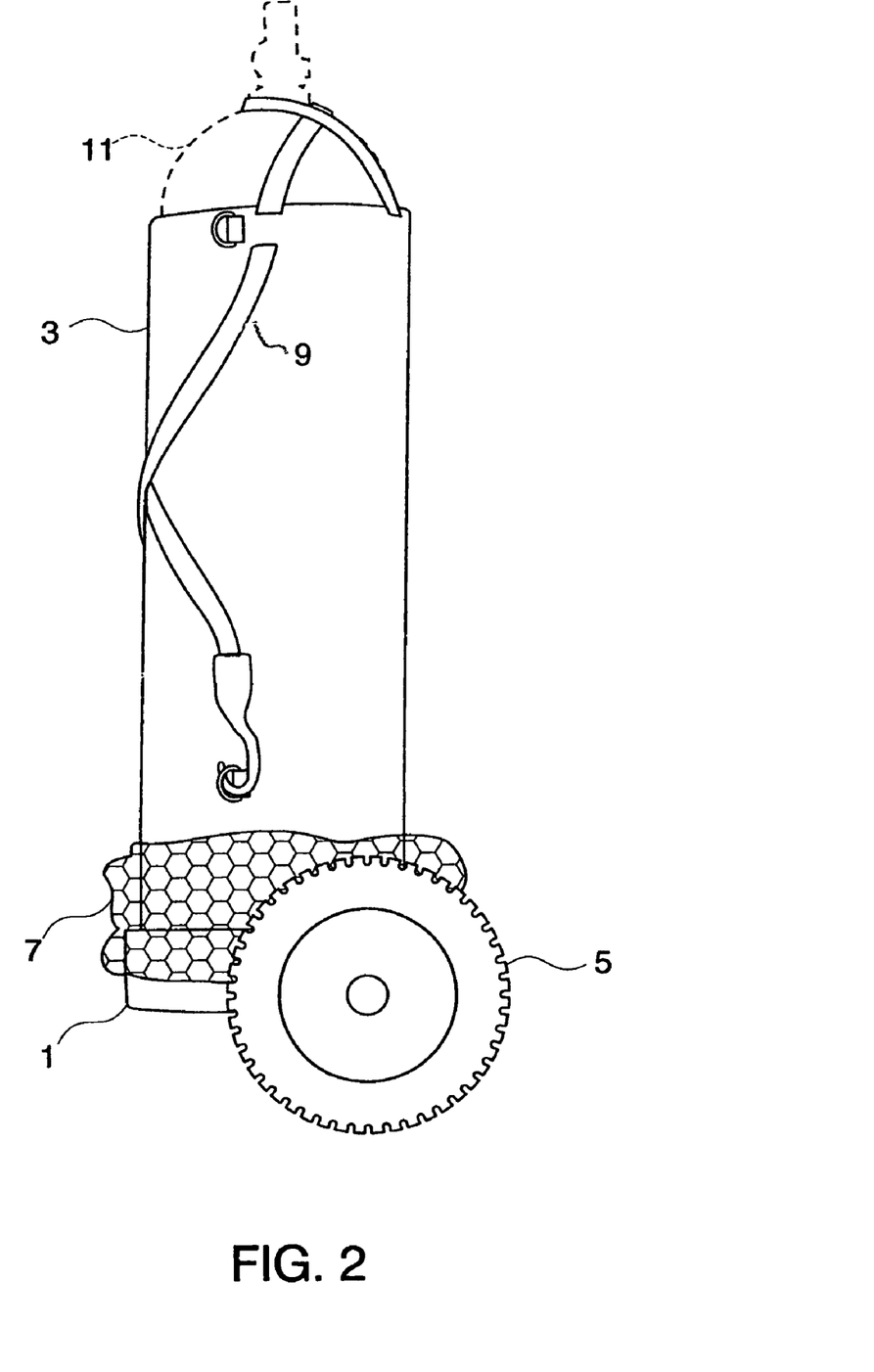
Figure 3:
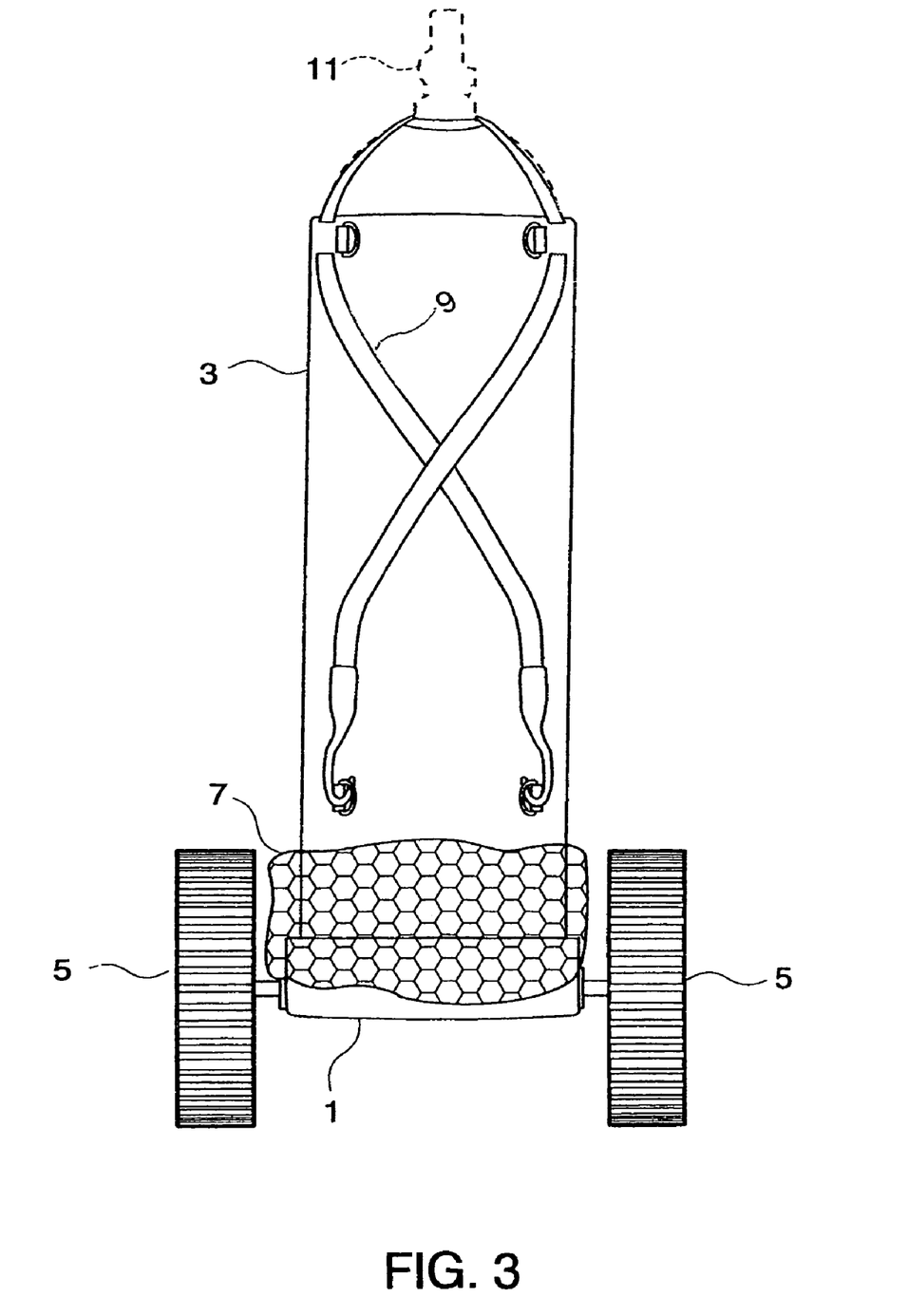
FIG. 3 is a 'top' view of the present embodiment of the invention, showing how the fastenable pocket [7] is of sufficient size to fit inside it the pair of removable and re-attachable wheels [5]. The strap [9] that can bind the scuba airtank [11] into the flexible, form-fitting sleeve [3] is also shown looping around the valve end of the scuba airtank [11].
Figure 4:
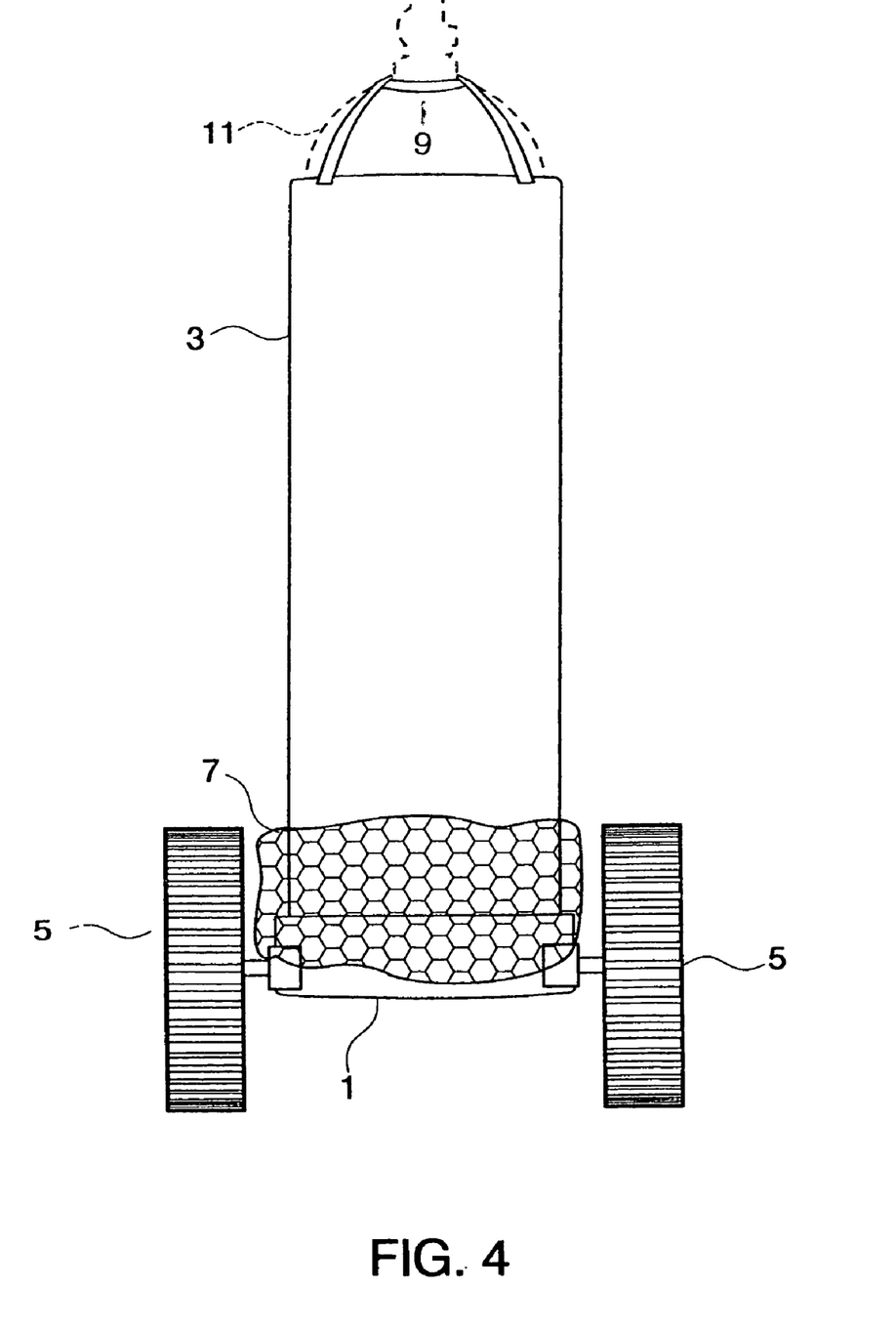
FIG. 4 is a 'bottom' view of the present embodiment of the invention, showing how the pair of removable and re-attachable wheels [5] can be attached to the base [1]. Shown but not labeled is a shorter, second strap attached to the flexible, form-fitting sleeve [3] that loops over and around the valve end of the scuba airtank [11] from this side, opposite to the longer strap [9].
Figure 5:
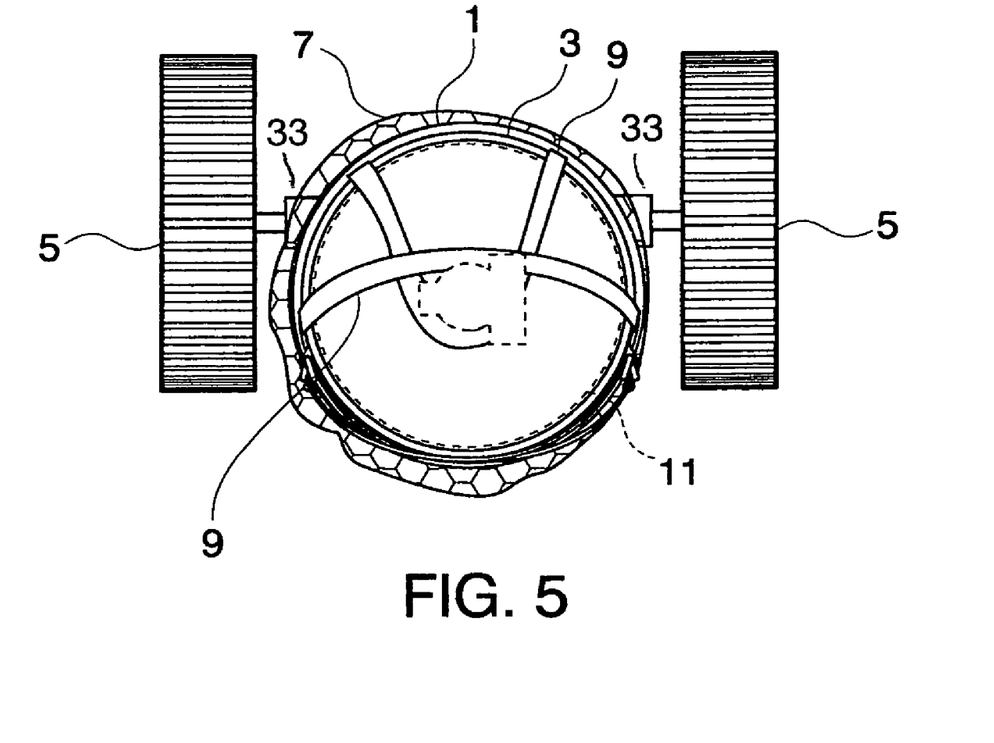
FIG. 5 is a 'front' view of the present embodiment of the invention, also showing how the pair of removable and re-attachable wheels [5] can be attached to the base [1], the fastenable pocket [7] and flexible, form-fitting sleeve [3] form a streamlined whole, and how the strap [9] and its opposite both loop around the valve end of the scuba airtank [11].
Figure 6:
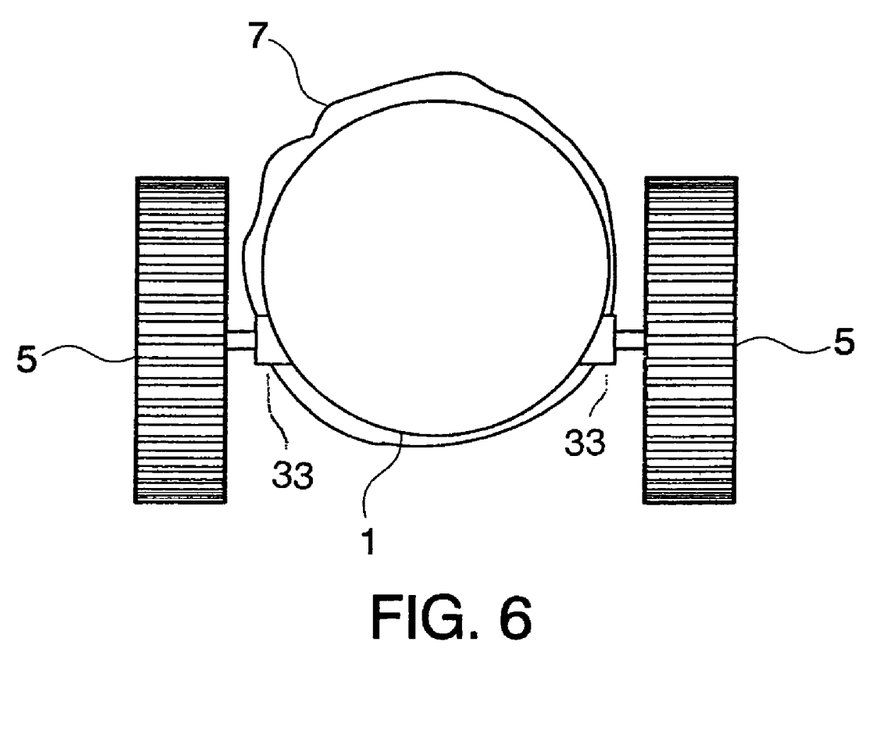
FIG. 6 is a 'rear' view of the present embodiment of the invention, showing how the fastenable pocket [7] and flexible, form-fitting sleeve [3] form a streamlined whole with the base [1], without catching in the wheels [5].
Figure 7:
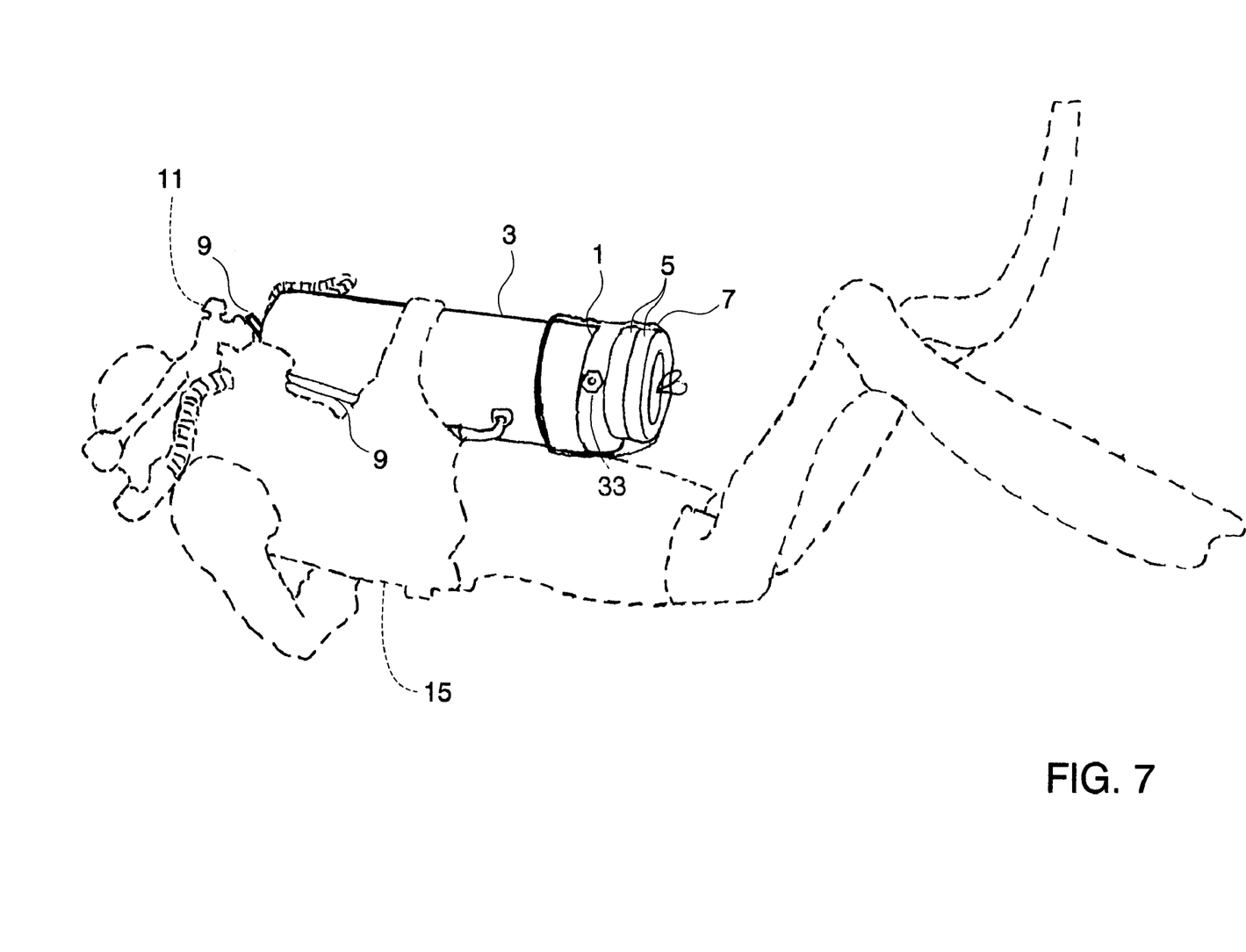
FIG. 7 is a view of the present embodiment of the invention as it is accompanying the diver during her dive; with the pair of removable and re-attachable wheels [5] removed, and placed and fastened inside, the fastenable pocket [7], that is attached to the base [1]; the diver is using the scuba airtank [11] which is still contained within the flexible, form-fitting sleeve [3] in part through the use of the strap [9], as the combination is attached to the diver's BCD [15].

Referring in detail to the drawings, in which identical parts are identically marked, the invention comprises a device for use in making beach-entry scuba dives by assisting the diver to transport scuba tanks and other diving gear across a beach or like land area and into the water, and then taking the device along with her during the dive, for ready access and use upon exiting the water.

Basically, the main parts of invention comprise a base; a flexible, form-fitting sleeve that can encompass at least one scuba airtank on its inside attached to said base; a pair of removable and re-attachable wheels that when attached to the base in a rolling position create, for the combination of said base, said flexible, form-fitting sleeve and said attached removable and re-attachable wheels, a top and bottom side and a lifting and towing end to that combination; at least one fastenable pocket on the external side of said flexible, form-fitting sleeve, into which said pair of removable and attachable wheels when removed will fit; and, at least one strap affixed to said flexible, form-fitting sleeve, that can bind said scuba airtank into the flexible, form-fitting sleeve and at least one other item of scuba gear to the external side of the flexible, form-fitting sleeve, and that can be fastened securely to prevent inadvertent release during transport and underwater use of the device. Each of said base, said flexible, form-fitting sleeve, said pair of removable and re-attachable wheels, said fastenable pocket, and said strap, are in the preferred embodiment comprised of lightweight, sturdy, and saltwater-corrosion-resistant material; and the combination of said base, said flexible, form-fitting sleeve, said fastenable pocket, and said strap form, when containing at least one scuba airtank and worn by a diver underwater, a streamlined whole minimizing the drag on the diver.

The base may be circular of solid plastic and/or non-corroding, or anodized, metal or other saltwater-proof material. It may, in an alternative embodiment, further comprise means for attaching and incorporating a motor that can drive the removable and re-attachable wheels when they are attached to the base in the rolling position.

The flexible, form-fitting sleeve may be of a flexible fabric and/or a like metal material, with a tubular overall shape and a circular open or closed bottom; but if of metal, it will be collapsible when not containing the scuba airtank. In an alternative embodiment, the tubular sleeve may instead be a collapsible container; in a second alternative embodiment, it may further comprise at least one pair of reinforcing, yet non-rigid, side-band elements; and in a third alternative embodiment, it may further comprise an element at the end of the opposite to the base that can be tightened to effect retention of the scuba airtank. In a different alternative embodiment the flexible, form-fitting sleeve if a fabric is any combination of saltwater corrosion resistant, washable, and capable of being removed from the base for temporary and non-diving needs of the diver; and if a collapsible container, is removably attached to the base.

In the preferred embodiment the device will further incorporate at least one handle that is attached to the flexible, form-fitting sleeve on the end, and extending away, from the base.

Another alternative embodiment would additionally comprise as part of the flexible, form-fitting sleeve, at least one (possibly a pair) of collapsible and removable supporting and strengthening element(s) fitting into the bottom and connecting with both the base and the handle so as to allow direct leverage from the handle along that element(s) and providing leverage and support for the weight of the scuba airtank and other gear, thereby reducing the felt drag on the handle.

The pair of removable and re-attachable wheels when attached to the base create a 'top' and 'bottom' side to the combination with the wheels on the 'bottom' side, where they can roll over the surfaces the combination is traversing. An alternative embodiment comprises a base that allows each of the wheels to be moved from a first rolling position to a second static storage position while still remaining attached to the base.

In the preferred embodiment, each of the removable and attached wheels has sufficient rim width to provide support for at least twenty-five pounds weight on dry sand, where 'sufficient' is defined as providing enough tread support to prevent the base, when the pair of removable and re-attachable wheels are attached to it, from dragging through a moderately level plane of sand while the device is being rolled across that moderately level plane of sand. Additionally, in the preferred embodiment, each of the removable and attachable wheels will have a diameter greater than one-half the horizontal distance across the base, measuring that horizontal distance across the base on the plane parallel to the axis between the wheels when attached in a rolling position. In an alternative embodiment each of the removable and attachable wheels will have a diameter equal or greater to that of the horizontal distance across the base, measuring on the plane parallel to the axis between the wheels when attached. Preferably, each wheel is formed of light-weight plastic material and comprises a cylindrical cross-section having a thin, rubber, notched tread on the outer surface.

In the preferred embodiment at least one fastenable pocket is attached to the exterior bottom of the base and incorporates a tightening means that can be operated by hand, thereby enabling storage of at least one item in a position where, while the diver is swimming, said at least one item maintains the streamlined design.

In the preferred embodiment of the invention, the handle unit is made of fabric to reduce weight, but in an alternative embodiment it could comprise a metal frame that attaches to the base and extends the length of the flexible, form-fitting sleeve or a fabric and or metal device attached to the top of the flexible, form-fitting sleeve.

In preferred embodiment two separate elastic-type straps are fixed to the top of the flexible, form-fitting sleeve and secure the scuba tank within the flexible, form-fitting sleeve. Additional hooks, rings and straps are used to attach more scuba gear to the device and/or to the tank.

Preferably, the rolling type device is formed of plastic material and comprises a cylindrical outer surface and rubber notched tread on the outer surface.

In typical use of the invention, tanks, BCD, mask, body weights, fins etc. will be transported across the beach or other land area to the water's edge or in the water. Here, the diver will remove such gear from the device and install it on his body leaving only a BCD on the device, which the diver then dons and is ready to start her dive.

It will be understood that the embodiments described herein are merely exemplary and that a person skilled in the art may make many variations and modifications without departing from the sphere and scope of the invention. All such variations and modifications are intended to be included in the scope of the invention as defined in the appended claims.

The claims stated herein should be read as including those elements which are not necessary to the invention yet are in the prior art and are necessary to the overall function of that particular claim, and should be read as including, to the maximum extent permissible by law, known functional equivalents to the elements disclosed in the specification, even though those functional equivalents are not exhaustively detailed herein. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicant hereby give notice that new claims may be formulated to such features and/or combinations of such features during the prosecution of the present application or of any further application derived therefrom.

I claim:

1. An amphibious and submersible device for transporting scuba gear, including at least one scuba airtank and at least one other item, across any combination of improved, unimproved and natural terrain, said device comprising:
   a base;
   a flexible, form-fitting sleeve that can encompass at least one scuba airtank on its inside, attached to said base;
   a pair of removable and re-attachable wheels that when attached to the base in a rolling position create, for the combination of said base, said flexible, form-fitting sleeve and said attached removable and re-attachable wheels, a top and bottom side and a lifting and towing end to that combination;
   at least one fastenable pocket on the external side of said flexible, form-fitting sleeve, into which said pair of removable and re-attachable wheels when removed will fit; and,
   at least one strap affixed to the exterior of said flexible, form-fitting sleeve at the end adjacent to said base, such that said strap can bind at least one item of scuba gear to the external side of the flexible, form-fitting sleeve, and affixed to the exterior of said flexible, form-fitting sleeve at the end opposite said base such that the strap passes over the opening of the flexible, form-fitting sleeve such that the strap, that can bind said scuba airtank into the flexible, form-fitting sleeve, and that can be fastened securely to prevent inadvertent release during transport and underwater use of the device;
   with each of said base, said flexible, form-fitting sleeve, said pair of removable and re-attachable wheels, said fastenable pocket, and said strap, being comprised of lightweight, sturdy, and saltwater-corrosion-resistant material; and,
   with the combination of said base, said flexible, form-fitting sleeve, said fastenable pocket containing said removable and re-attachable wheels, and said strap forming, when containing at least one scuba airtank and worn by a diver underwater, a streamlined whole.

2. A device as in claim 1, wherein each of the pair of removable and re-attachable wheels further:
   has sufficient rim width to provide support for at least twenty-five pounds weight on dry sand, that being enough to prevent the base, when the pair of removable and re-attachable wheels are attached to it, from dragging through a moderately level plane of sand while the device is being rolled across that moderately level plane of sand;
   and,
   has a diameter greater than one-half the horizontal distance across the base, measuring the base on the plane parallel to the axis between the wheels when attached in a rolling position.

3. A device as in claim 2, wherein each of the pair of removable and re-attachable wheels can provide support for at least one hundred pounds weight.

4. A device as in claim 2, wherein the rim width is at least one and one-eighth inch.

5. A device as in claim 3, wherein each of the pair of removable and re-attachable wheels has a diameter equal or greater to that of the horizontal distance across the base, measuring on the plane parallel to the axis between the wheels when attached.

6. A device as in claim 1, further comprising at least one handle attached to the flexible, form-fitting sleeve on the end away from, and extending away from, the base, said handle to be used during land transport when rolling the device (with encompassed scuba airtank) across the terrain.

7. A device as in claim 1, wherein said flexible, form-fitting sleeve further comprises:
   a fabric that is saltwater corrosion resistant;
   a fabric that is washable; and,
   wherein said flexible, form-fitting sleeve can be removed from the base for temporary and non-diving needs of the diver.

8. A device as in claim 1, wherein the at least one fastenable pocket into which said pair of removable and re-attachable wheels when removed will fit is attached to the external side of said flexible, form-fitting sleeve adjacent to the exterior bottom of the base and incorporates a tightening means that can be operated by hand, thereby enabling storage of at least one item in a position where, while the diver is swimming, said at least one item maintains the streamlined design.

9. A device as in claim 1, wherein the flexible, form-fitting sleeve further comprises at least one pair of reinforcing, yet non-rigid, side-band elements.

10. A device as in claim 1, wherein the flexible, form-fitting sleeve further comprises at least one reinforcing, collapsible and removable supporting and strengthening element fitting along the bottom of the flexible, form-fitting sleeve and connecting with both the base and the handle so as to both allow direct leverage from the handle along that element and provide support for the weight of the scuba airtank and other gear.

11. A device as in claim 1, further comprising an element at the end of the flexible, form-fitting sleeve opposite to the base that can be tightened to effect retention of the scuba airtank within the flexible, form-fitting sleeve.

12. A device as in claim 1, wherein the combination further comprises means for attaching and incorporating a motor that can drive the removable and re-attachable wheels when they are attached to the base in the rolling position.

13. An amphibious and submersible device for transporting scuba gear, including at least one scuba airtank and at least one other item, across any combination of improved, unimproved and natural terrain, said device comprising:
   a base;
   a flexible, collapsible container that can encompass at least one scuba airtank on its inside, attached to said base;
   a pair of removable and re-attachable wheels that when attached to the base in a rolling position create, for the combination of said base, said flexible, collapsible container and said attached removable and re-attachable wheels, a top and bottom side and a lifting and towing end to that combination;
   at least one fastenable pocket on the external side of said flexible, collapsible container, into which said pair of removable and attachable wheels when removed will fit entirely;
   at least one strap affixed to the exterior of said flexible, collapsible container at the end adjacent to said base, such that said strap can bind at least one item of scuba gear to the external side of the flexible, collapsible container, and affixed to the exterior of said flexible, collapsible container at the end opposite said base such that the strap passes over the opening of the flexible, collapsible container such that the strap can bind said scuba airtank into the flexible, collapsible container, and that can be fastened securely to prevent inadvertent release during transport and underwater use of the device;
   with each of said base, said flexible, collapsible container, said pair of removable and re-attachable wheels, said fastenable pocket, and said strap, being comprised of lightweight, sturdy, and saltwater-corrosion-resistant material; and, with the combination of said base, said flexible, form-fitting container, said fastenable pocket, and said strap, forming when containing at least one scuba airtank and worn by a diver underwater a streamlined whole minimizing the drag on the diver; and, means for attaching the combination of said base, said flexible, collapsible container, said fastenable pocket, and said strap to an item of scuba gear worn by a diver such that said combination when so attached can be said to be worn by the diver.

14. A device as in claim 13 wherein the flexible, collapsible container is removably attached to said base.

15. A device as in claim 13 wherein the at least one fastenable pocket into which said pair of removable and re-attachable wheels when removed will fit is attached to the external side of said flexible, collapsible container adjacent to the exterior bottom of the base and incorporates a tightening means that can be operated by hand, thereby enabling storage of at least one item in a position where, while the diver is swimming, said at least one item has its drag reduced and streamlined design maintained.

16. An amphibious and submersible device for transporting scuba gear, including at least one scuba airtank and at least one other item, across any combination of improved, unimproved and natural terrain, said device comprising:

a base;

a flexible, form-fitting sleeve that can encompass at least one scuba airtank on its inside, attached to said base;

a pair of wheels attached to said base, said attachment further comprising:

a separate axle for each wheel, each axle having a first rolling position and a second static position, into each of which it can be latched and between which it can be moved without use of any external tool;

said first rolling position being used during land transport, further comprising:

the pair of wheels, measuring through their radial width from hub to rim, are parallel with both each other and the long axis of the airtank;

each wheel's hub side closest to the base is positioned beyond the external edge of the base;

the pair of wheels are on a same side of each of the base, the flexible, form-fitting sleeve, and encompassed airtank, such that this position during land transport places the pair of wheels on the bottom side of the combination of wheels, base, flexible, form-fitting sleeve, and airtank, and places a lifting and towing end of that combination at the far end and opposite side of the combination;

said second static position being used during underwater use, wherein:

each wheel, measuring through its radial width from hub to rim, is parallel with the long axis of the airtank;

each wheel's hub side closest to the base is positioned beyond the external edge of the flexible, form-fitting sleeve;

measuring from the diver's head, each wheel's outer rim edge does not protrude more than half of the wheel's diameter beyond the bottom of the airtank;

measuring from the diver's back while swimming with the scuba airtank, each wheel's outer rim edge does not protrude more than one-half the wheel's diameter beyond the plane of meeting between the flexible, form-fitting sleeve and the diver's back; and, in the said static position neither wheel interferes with the swimming motions of the diver nor with the diver's movements needed to safely manage the continued flow of oxygen, maintain the desired level of bouyancy (positive, neutral, or negative) of the diver plus device plus diver's other gear, or diver's motions in an emergency involving malfunction of the scuba airtank, regulator, or bouyancy control device;

at least one fastenable pocket on the external side of said flexible, form-fitting sleeve; and, at least one strap affixed to the exterior of said flexible, form-fitting sleeve at the end adjacent to said base, such that said strap can bind at least one item of scuba gear to the external side of the flexible, form-fitting sleeve, and affixed to the exterior of said flexible, form-fitting sleeve at the end opposite said base such that the strap passes over the opening of the flexible, form-fitting sleeve such that the strap can bind said scuba airtank into the flexible, form-fitting sleeve and that can be fastened securely to prevent inadvertent release during transport and underwater use of the device;

with each of said base, said flexible, form-fitting sleeve, said pair of wheels and separate axles, said fastenable pocket, and said strap, being comprised of lightweight, sturdy, and saltwater-corrosion-resistant material; and, with the combination of said base, said flexible, form-fitting sleeve, said fastenable pocket, said wheels in the second static position, and said strap, all forming, when containing at least one scuba airtank and worn by a diver underwater, a streamlined whole.

17. An amphibious and submersible device for transporting scuba gear, including at least one scuba airtank and at least one other item, across any combination of improved, unimproved and natural terrain, said device comprising:

a base;

a flexible, form-fitting sleeve that can encompass at least one scuba airtank on its inside, attached to said base;

a pair of removable and re-attachable wheels that when attached to the base in a rolling position create, for the combination of said base, said flexible, form-fitting sleeve and said attached removable and re-attachable wheels, a top and bottom side and a lifting and towing end to that combination;

at least one fastenable pocket into which said pair of removable and re-attachable wheels when removed will fit, which is attached to the exterior bottom of the base and incorporates a tightening means that can be operated by hand, thereby enabling storage during underwater use of said pair of removable and re-attachable wheels when removed in a position where, while the diver is swimming, said device maintains a streamlined design without interfering with the diver's leg motions; and, at least one strap affixed to the exterior of said flexible, form-fitting sleeve at the end adjacent to said base, such that said strap can bind at least one item of scuba gear to the external side of the flexible, form-fitting sleeve, and affixed to the exterior of said flexible, form-fitting sleeve at the end opposite said base such that the strap passes over the opening of the flexible, form-fitting sleeve such that the strap can bind said scuba airtank into the flexible, form-fitting sleeve, and that can be fastened securely to prevent inadvertent release during transport and underwater use of the device;

with each of said base, said flexible, form-fitting sleeve, said pair of removable and re-attachable wheels, said fastenable pocket, and said strap, being comprised of lightweight, sturdy, and saltwater-corrosion-resistant material; and, with the combination of said base, said flexible, form-fitting sleeve, said fastenable pocket containing said removable and re-attachable wheels, and said strap forming, when containing at least one scuba airtank and worn by a diver underwater, a streamlined whole.

* * * * *